US007259898B2

(12) United States Patent
Khazova et al.

(10) Patent No.: US 7,259,898 B2
(45) Date of Patent: Aug. 21, 2007

(54) DIRECT VIEW LC DISPLAY

(75) Inventors: Marina Khazova, Oxfordshire (GB); Grant Bourhill, Stow-on-the-wold (GB); Bronje M. Musgrave, Sutton Courtenay (GB); Adrian M. S. Jacobs, Oxford (GB); Allan Evans, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 228 days.

(21) Appl. No.: 10/913,893

(22) Filed: Aug. 6, 2004

(65) Prior Publication Data

US 2005/0063029 A1    Mar. 24, 2005

(30) Foreign Application Priority Data

Aug. 9, 2003    (GB)    ................... 0318791.1

(51) Int. Cl.
   *G02B 5/32*    (2006.01)
(52) U.S. Cl. .............................. 359/15; 359/13; 349/15
(58) Field of Classification Search ............ 359/13–15, 359/22–23, 464; 349/15
   See application file for complete search history.

(56) References Cited

U.S. PATENT DOCUMENTS

| 5,112,121 | A | * | 5/1992 | Chang et al. ................. 359/15 |
| 6,038,071 | A | * | 3/2000 | Chikazawa .................. 359/464 |
| 6,233,071 | B1 | * | 5/2001 | Orr et al. ..................... 359/23 |
| 6,595,648 | B1 |   | 7/2003 | Woodgate et al. |
| 6,665,100 | B1 | * | 12/2003 | Klug et al. ................... 359/23 |
| 6,731,416 | B2 | * | 5/2004 | Hazzard ...................... 359/24 |
| 2003/0086136 | A1 |   | 5/2003 | Orr et al. |

FOREIGN PATENT DOCUMENTS

WO    03/015424 A2    2/2003

OTHER PUBLICATIONS

K.Iizuka, "Engineering Optics", Springer-Verlag, pp. 195-196(1985).*
B.E.A. Saleh and M.C. Teich, "Fundamentals of Photonics", Wiley-Interscience, p. 151(1991).*
European Search Report regarding Application No. 04270006.2 dated Apr. 5, 2005.
David Trayner, Edwina Orr; "Developments in Autostereoscopic Displays using Holographic Optical Elements", SPIE-The International Society for Optical Engineering; vol. 3012, pp. 167-174, 1997.

* cited by examiner

Primary Examiner—Leonidas Boutsikaris
(74) Attorney, Agent, or Firm—Renner, Otto, Boisselle & Sklar, LLP

(57) ABSTRACT

A display is provided having first and second direct view modes of operation. The display comprises a liquid crystal display panel and a backlight which is illuminated during the first mode so that the displayed image is visible throughout an extended viewing region in front of the device. The display also comprises a holographic element and a front light source, which is switched on for the second direct view mode. The holographic element redirects light from the front light source into part of the extended viewing region so that an image displayed by the device is visible in only a restricted portion of the viewing region.

11 Claims, 14 Drawing Sheets

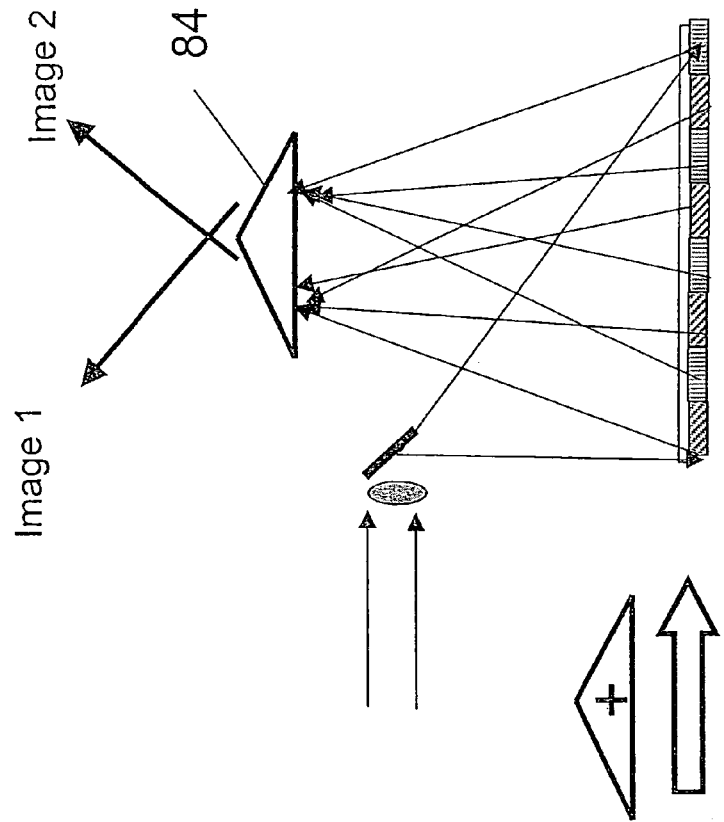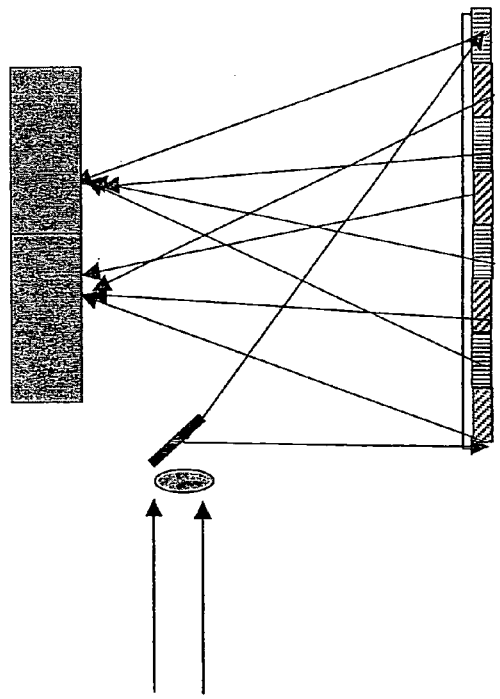
Fig. 6

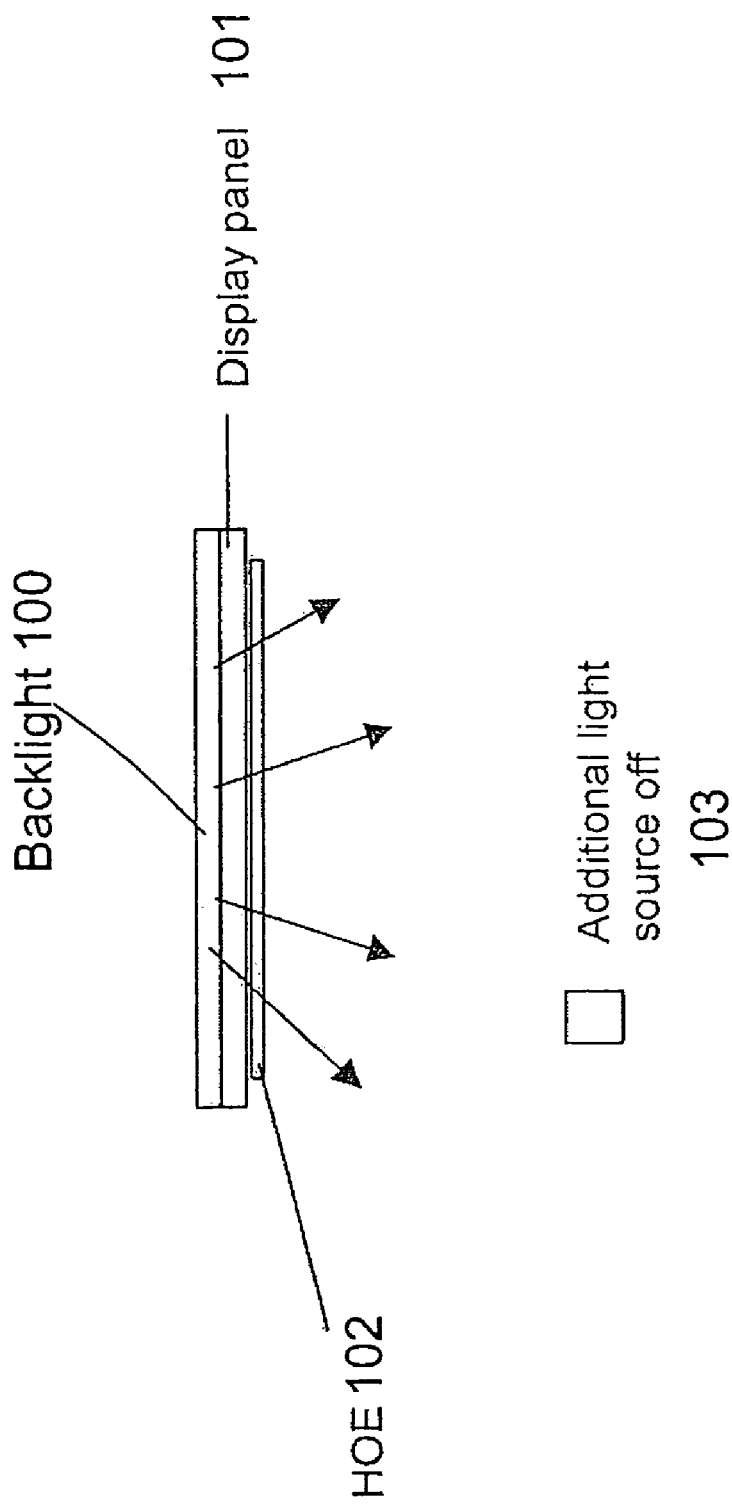

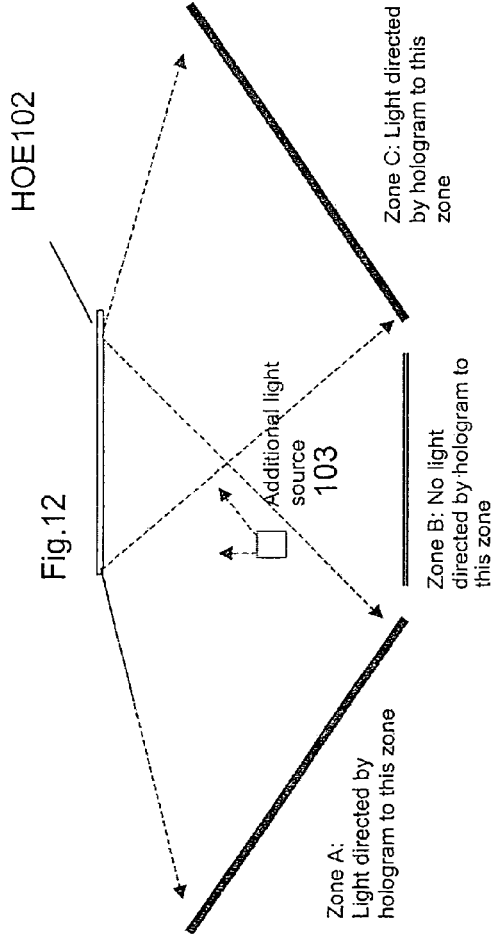
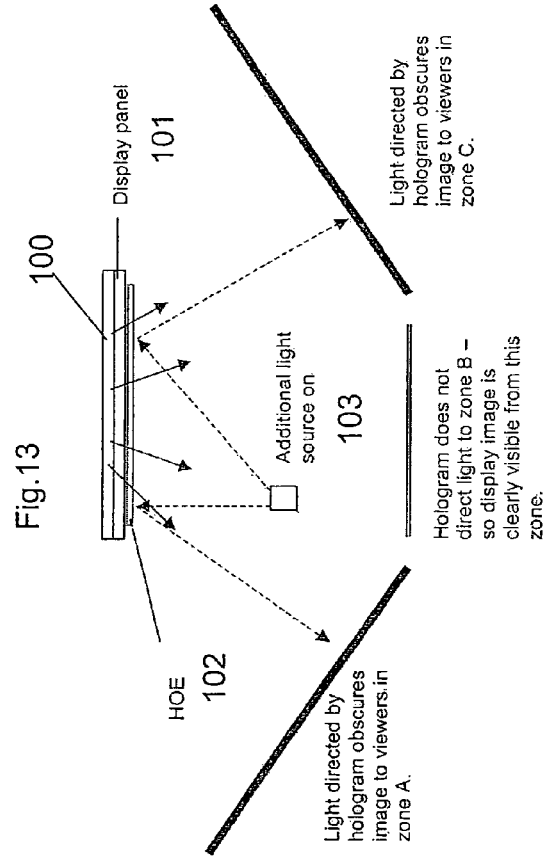

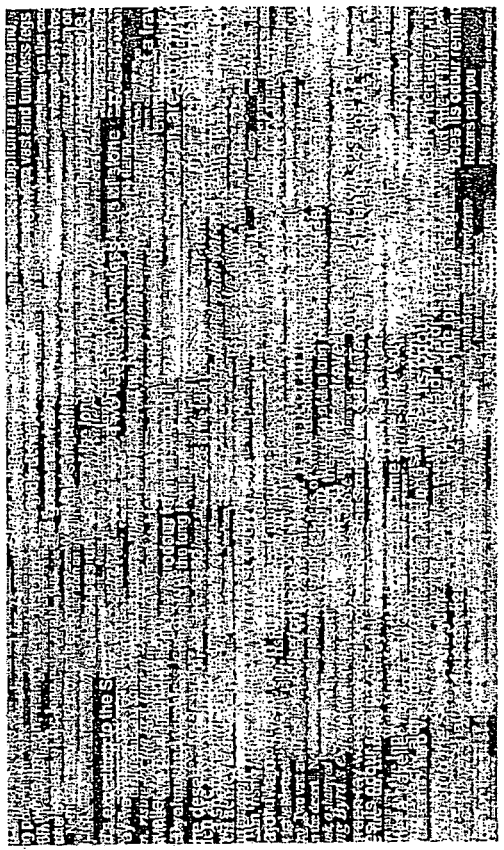
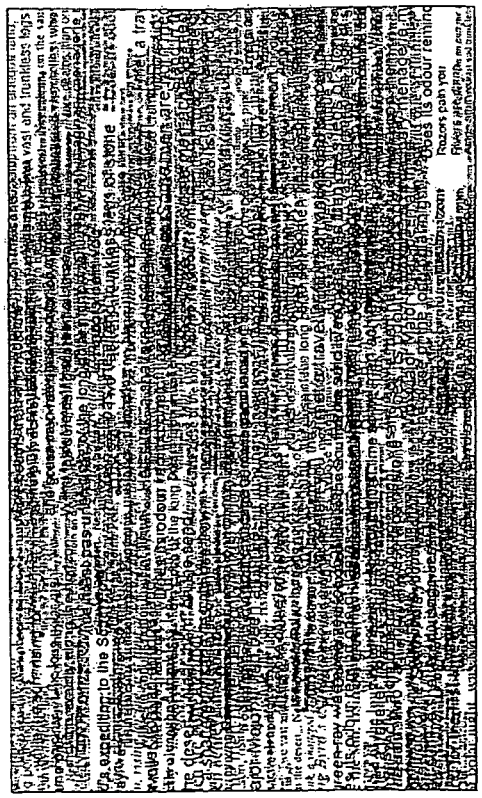
Fig. 14

DIRECT VIEW LC DISPLAY

TECHNICAL FIELD

The present invention relates to a direct view LC display for producing at least one image in at least one viewing window. It is particularly suitable for personal communication display devices and multi-view displays, such as dual view or 3D displays, and may allow two or more different images to be seen on the same display screen.

BACKGROUND

Liquid crystal displays are commonly used as image display devices for personal communication devices such as mobile phones and personal digital assistants (PDAs). For many years now displays have been designed for multiple users and optimized so that viewers can see the same good image quality and the same image from different angles with respect to the display. This assumes that the multiple users require the same information from the display. However, there are many applications where it would be desirable to be able to see different information from the same display in spatially separated viewing windows, such as for 3D or dual view operation. For example, in computer games when each player may wish to view the game from his or her own perspective. This is currently done by each player viewing their unique perspective on individual screens, which takes up a lot of space and is not practical for portable games. By showing more than one image in more than one viewing window from the same display, there can be a considerable saving in space and cost. There is also the ability to preclude the users from seeing each other's views, which may be a desirable option in security applications such as banking or sales transactions as well as games.

Several techniques are known in the prior art for producing three-dimensional images. These techniques include: computer graphics which simulate 3D images on two-dimensional displays; stereoscopic displays where left and right retinal images are mentally fused into one image; and holographic images which reconstruct the actual wavefront structure reflected from an object.

Three dimensional displays are classified into two types depending on the method used to supply the different views to the eyes (or different viewers).

Stereoscopic displays typically display both of the images over a wide viewing area. However, each of the views is encoded, for instance by colour, polarization state or time of display, so that a filter system of glasses worn by the observer can separate the views and will only let each eye see the view that is intended for it. Without this distinction, each eye would see both views in all spatial positions.

Autostereoscopic displays require no viewing aids to be worn by the observer but rather the two views are only visible from defined regions of space. The region of space in which an image is visible across the whole of the display unit active area is termed a "viewing region". If the observer is situated such that one of their eyes is in the viewing region for one image and the other eye is in the viewing region for the other image of the stereoscopic pair then a correct set of views will be seen and a three-dimensional image will be perceived.

"New Autostereoscopic Display System", Ezra et al, SPIE Vol. 2409, February 1995 describes two standard LCDs mounted at 90° with beam combining optics to send the image from one LCD to one eye and the image from the second LCD to the second eye. However, this display apparatus, which uses 2 SLMs, is too large and too expensive for the mass market.

For single panel flat panel autostereoscopic displays, the formation of the viewing regions is typically due to a combination of the pixel structure of the display unit and an optical element, generically termed a parallax optic. An example of such an optic is a parallax barrier. Parallax barrier technology was first used by Ives for 3D display purposes in 1903. The parallax barrier may be an array of transmitting slit apertures on an absorbing optical element attached to the front or rear surface of a LCD device. The slit apertures are vertical and the distance between the slits is slightly less than twice the spacing between two pixels on the display for a front parallax barrier. The barrier generally lies on the surface of a polariser at a fixed distance from the pixel plane. A viewer in a defined region will be able to see with one eye alternate columns of pixels on the display and with the other eye will be able to see the intermediate columns of pixels. If the alternate and intermediate columns show separately two homologous stereoscopic images, then the viewer is able to see a stereoscopic image. Examples of 3D LCD devices with parallax barriers may be found, for example, in: G. J Woodgate, J Harrold, A. M. S Jacobs. R. R. Mosely, D. Ezra. "Flat Panel Autostereoscopic Displays-Characterisation and Enhancement", SPIE Vol. 3957. This display has the disadvantage that it is generally 20-30% of the brightness of the base LCD panel. This is due mainly to the dark areas of the barrier and absorption in the slit. In addition, the resolution of the 3D display is half that of the base LCD; thus 2D images and especially small text become degraded by aliasing artifacts and can be difficult to read.

EP 0829744 describes a display device electronically switchable between 2D and 3D modes of operation. It suggested to use a latent parallax barrier which can be "developed" and, thus, configure 2D to 3D system. This system has the advantages of an autostereoscopic 3D mode along with a full brightness and full resolution in 2D mode. With no "developing" polariser on the display, the latent barrier is not seen as the eye does not distinguish between polarization states. If a developing polariser is placed over the display such that the polariser axis is orthogonal to the light coming from the "absorbing" part of the retarder barrier, the polarized light from the "absorbing" stripes is blocked while light from the "transmitting" stripes passes through the polariser. However, such a display device operates in 3D mode with only a half of the resolution and less than a half of the brightness of 2D mode.

D. Trayner, E. Orr "Development in autostereoscopic displays using Holographic Optical Elements", SPIE Proc. v. 3012, pp. 167-174, 1997 describes the use of a transmission holographic optical element (HOE) for angular separation of left/right images from a transmissive LCD illuminated from the rear by an external light source. The HOE comprises two sets of horizontal (rows) stripes, and each set of stripes reconstructs a real image of a diffuse viewing window.

In the above-mentioned prior art the LCD may be positioned immediately in front of or behind the HOE, and the LCD and HOE are illuminated from the rear by an internal light source. However, because the internal light source must be at a distance from the LCD and HOE, this makes for a relatively bulky device. Furthermore; the device cannot produce simple 2D images, and cannot be used as a 2D backlit LCD and there is therefore no ability to switch between 2D and 3D operation.

G. L. Valliath, Z. A. Coleman et al. "Design of Hologram for Brightness Enhancement in Colour LCDs". SID98 Digest; 44.5L, 1139-1142; 1998 refers to the use of a transmission hologram for brightness enhancement of a front illuminated reflective LCD. The holographic element is permanently attached to a front surface of a reflective LCD device illuminated by a distant light source positioned at 34° offset and above a display and emitting substantially collimated light. The holographic element has no optical function for the light incident from the light source, but steers and scatters the light reflected by an internal LCD reflector into a viewing zone 0°-14° from the normal axis to a display surface. The light source has to be distant to ensure uniform and substantially collimated illumination under achromatic angle (to satisfy chromatic correction of the holographic element).

U.S. Pat. No. 6,271,808 describes a stereo head-mounted display apparatus using a single grating light valve frame sequential display. This display may be used in 2D and 3D modes. The right image is directed to a right eye of the user, and the left image is directed to the left eye of the user. In a non-stereoscopic mode, both images are the same. The grating light valve display receives the light from left and right sources and sequentially sends the image to the left and right eyes.

Physical Optics Corporation demonstrated a prototype of 3D projection display. This is described at http://www.poc-.com/emerging_products/3d_display/default.asp. This 3D projection display employs two projectors for projecting left and right images to a directional screen. Left and right images are angularly separated and spatially overlapped in the plane of a projection screen.

U.S. Pat. No. 5,917,562 describes an autostereoscopic display device comprising a pair of polarised light sources and an optical system for imaging the light sources into two spatially separated viewing zones. An LCD includes an array of polarisation sensitive elements, adjacent and aligned to a pixel structure of the LCD. The optical axis of a polarising element of a first type is chosen to transmit light of the polarisation of the first light source and to absorb light of the polarisation of the second light source. The optical axis of a polarising element of a second type is chosen to transmit light of the polarisation of the second light source and to absorb light of the polarisation of the first light source. Thus, only the image generated in a pixel set associated with the polarising elements of the first type is displayed in a right viewing window and only the image generated in a pixel set adjacent to the elements of the second type is displayed in the left viewing window.

To increase the functionality of direct view transmissive displays to project enlarged images on to an external projection screen, U.S. Pat. No. 6,595,648 discloses a projection display comprising a transmissive LCD with a volume reflection hologram permanently attached to its rear surface and an external front illuminator. The reflection hologram is arranged to act like a lens to form an image of the light source which is spatially displaced from the original image of the light source formed by condensing optics. This hologram has substantially no function when the transmissive display is illuminated by backlight and operates in direct view mode. The hologram functions as a reflector and an off-axis lens.

The device of the above prior art document cannot produce 3D or dual view images.

A projection display using a reflective LCD and a polarising beam splitter is disclosed in U.S. Pat. No. 6,359,719.

Japanese Patent Application JP2002-268005 discloses a portable projection display which projects the image from the display element or its intermediate image on an eyeball of the observer.

SUMMARY

According to the invention, there is provided a display having a first direct view mode of operation and comprising a liquid crystal display device and a backlight disposed behind the display device and arranged, during the first mode, to render an image, displayed by the display device during the first mode, visible throughout an extended viewing region in front of the display device, characterised in that the display has a second direct view mode and comprises a first holographic element and a first front light source disposed in front of the display device and the first holographic element and arranged to be actuated during the second mode, the first holographic element being arranged to redirect light from the first front light source into part of the extended viewing region so that at least one image displayed by the display device during the second mode is visible only in a restricted portion of the extended viewing region.

The first holographic element may be a holographic optical element arranged to direct light from the first front light source to the restricted portion, which comprises at least one spatially limited viewing window, and the backlight may be arranged to be deactuated during the second mode. The display device and the first holographic element may be arranged to produce at least first and second viewing windows in which at least first and second images displayed by the display device in the second mode are visible. The first and second images may be visible in the first and second viewing windows simultaneously.

The first holographic element may be divided into a plurality of regions comprising a first set of regions arranged to redirect light from the first front light source into the first viewing window and a second set of regions arranged to redirect light from the first front light source into the second viewing window. The first and second regions may comprise first and second sets of stripes, aligned with rows or columns of pixels of the display device.

The first and second images may form a 3D image.

The first and second viewing windows may be non-contiguous so that, in the second mode, the display operates in a multiple view mode.

The first holographic element may be a volume reflection hologram and the display device may be of a transmissive type.

The display may comprise a second holographic optical element and a second front light source disposed in front of the display device, the first and second holographic elements being disposed behind the display device and being arranged to redirect light from the first and second front light sources, respectively, to first and second viewing windows, respectively. The first and second front light sources may be arranged to actuated alternately during the second mode. The first and second holographic elements may be continuous and non-pixellated.

The display may comprise second and third holographic optical elements and second and third front light sources disposed in front of the display device, the first to third holographic elements being disposed behind the display device and being arranged to redirect light from the first to third front light sources, respectively, to first to third viewing windows, respectively, the front light sources being arranged to be actuated one at a time in a repeating sequence, each of the holographic elements comprising three sets of regions for redirecting light of three colours into the viewing windows.

The display may comprise optical means for increasing the angular separation of the first and second images.

The backlight and the first front light source may be arranged to be actuated simultaneously during the second mode, and the first holographic element, when illuminated by the first front light source, may redirect light to the extended viewing regions outside the restricted portion so as to render the at least one image displayed by the display device unintelligible when viewed from the extended viewing region outside the restricted portion.

The first holographic element may redirect light substantially uniformly into the extended viewing region outside the restricted portion when illuminated by the first front light source.

The first holographic element, when illuminated by the first front light source, may display at least one obscuring image which is visible in the extended viewing region outside the restricted portion. The at least one obscuring image may comprise a first obscuring image, which is visible in a part of the extended viewing region outside the restricted portion, and a second obscuring image, which is visible throughout the extended viewing region outside the said part and outside the restricted portion. The second obscuring image may be a negative of the first obscuring image. The first obscuring image may be a monochrome image.

BRIEF DESCRIPTION OF DRAWINGS

FIG. 6 shows one possible embodiment of multi-view attachment with enhanced angular separation of images;

FIG. 11 is a diagrammatic plan view illustrating a first mode of operation of the display of FIG. 10;

FIG. 12 is a diagrammatic plan view illustrating the operation of a holographic element of the display of FIG. 10;

FIG. 13 is a diagrammatic plan view illustrating operation in a second "privacy" mode of the display of FIG. 10;

FIG. 14 illustrates obscuring images recorded in the holographic element of the display of FIG. 10.

Like reference numerals refer to like parts throughout the drawings.

DETAILED DESCRIPTION

Figure 1:
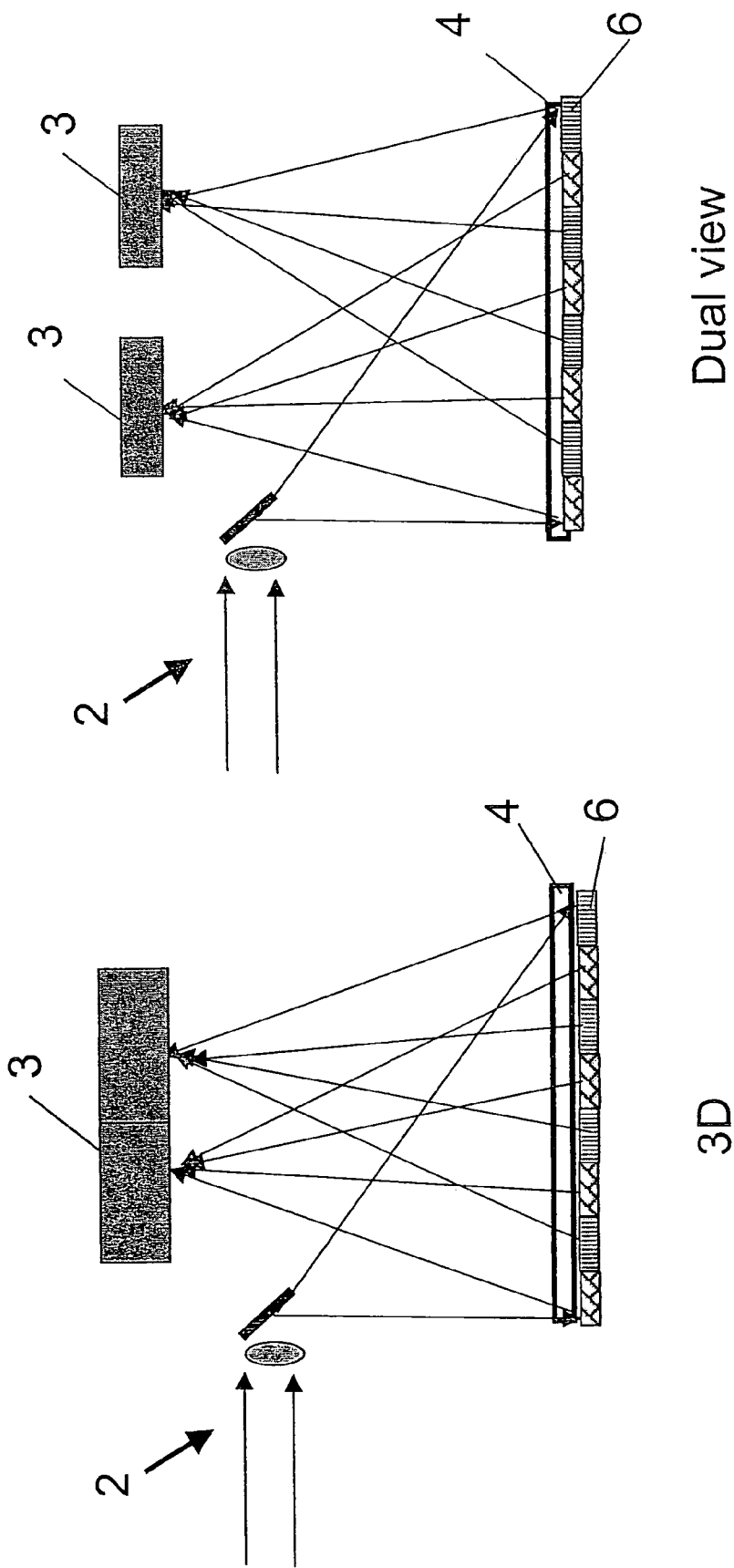
FIG. 1 shows a schematic view of a multi-view reflective attachment for a transmissive direct view display.

An external front illumination section 2 (which may be a clip-on attachment or a fixed, not connected to LCD device, unit) illuminates an LCD 4 with attached holographic optical element (HOE) 6 from a pre-determined position. LCD 4 and HOE 6, working in co-operation, directionally reflect light in the direction of viewing windows 3. The angular separation of images and their location is defined by the design of the HOE and may be used for generation of two different viewing windows to form either an autostereoscopic image or two views for dual-view operation, as illustrated in FIG. 1. The brightness of the multi-view mode does not depend on the brightness of the 2D mode as it uses an auxiliary light source 2 for multi-view operation. The brightness of the multi-view mode may be controlled independently.

The LCD 4 may be of a transmissive type, and the HOE 6 as a volume reflection hologram is attached to its rear side, as shown in FIG. 1.

Figure 2:
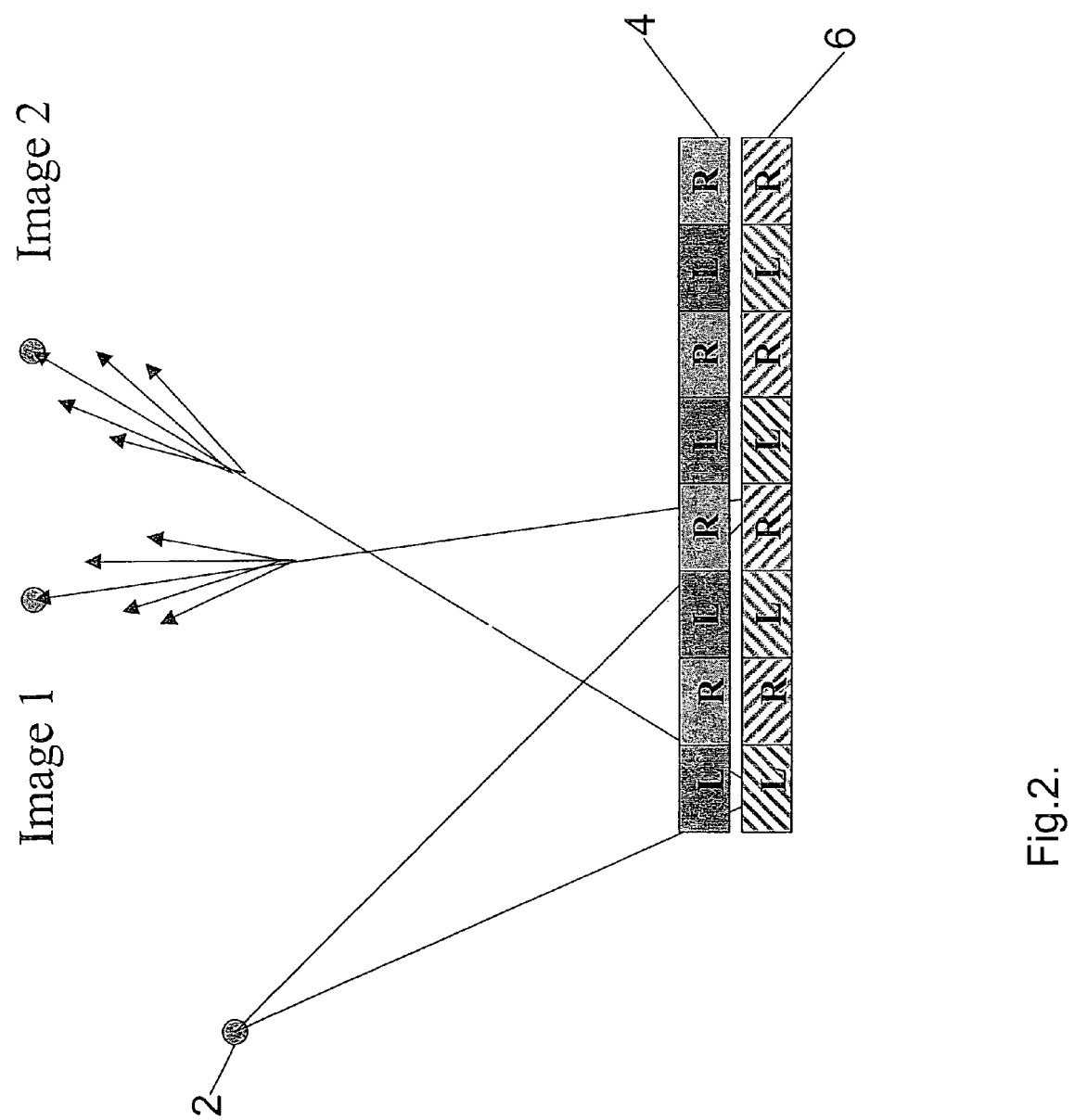
FIG. 2 schematically explains principle of operation of reflective type holographic optical element to form two viewing windows.

Such a HOE 6 consists of two types of alternating stripes, with their widths substantially equal to either the pixel columns or pixel rows of the LCD panel 4, as illustrated in FIG. 2. Stripes of a first type, associated with one set of pixel columns of the LCD 4, form the image 1 when illuminated by the external illumination section 2. Stripes of a second type, associated with the other set of LCD pixel columns, form the image 2 when illuminated by the external light source 2. The angular separation of images 1 and 2 and their location is defined by the design of the HOE 6 and may be used for generation of an autostereoscopic image or two different viewing windows for dual-view operation.

As the HOE 6 forms an image in the viewing windows which are relatively small with the respect to LCD screen 4, substantially all the light from the LCD 4 is concentrated in these viewing windows at a specified location. This increases the visual perception of the image brightness.

The HOE 6 is a volume reflection hologram, so it has substantially no effect on backlight illumination and operation of the LCD device in 2D transmissive mode. The HOE 6 also has no light blocking or parallax restriction parts, so the display brightness in 2D mode of operation is not compromised.

Thus, the display has first and second direct view modes of operation. In the first mode (for example for 2D viewing), a backlight (not shown) is switched on whereas the front illumination source 2 is switched off. The HOE 6 has substantially no optical effect so that the image or sequence of images displayed on the LCD 4 is visible throughout an extended viewing from in front of the LCD 4.

In the second mode (for example for 3D autostereoscopic viewing, multiple independent image viewing or privacy viewing), the backlight may be switched off and the illumination source 2 is switched on. In this mode, the HOE 6 redirects light from source 2 into a restricted portion of the extended viewing zone to define the viewing windows 3. The images displayed by the LCD 4 are thus only visible in the viewing windows 3.

The HOE 6 may be RGB (Red, Green, Blue) pixelated or fabricated as 3 continuous elements working in co-operation with colour filters of the LCD 4. This design substantially relaxes tolerances for alignment of the HOE 6 as it need not be accurately registered with the pixel structure of the LCD 4.

The HOE 6 may be recorded as a volume reflection hologram in a variety of high resolution light-sensitive materials such as silver halide, dichromated gelatin (DCG) or DuPont photopolymers.

The HOE 6 may be laminated onto the rear surface of the LCD display 4 or preferably, integrated with a rear substrate of the LCD device.

To increase the efficiency of light utilization, the spectral response of the HOE 6 may be designed to match the spectral characteristics of the illumination source 2.

To increase the efficiency of light utilization, the spectral response of the HOE 6 may be designed to match the spectral transmission of LCD colour filters.

Alternatively, to further increase the efficiency of light utilization, the spectral characteristics of the illumination source 2 and spectral response of the HOE 6 may be designed to match the transmission of LCD colour filters.

Alternating stripes of the HOE 6 may be associated with pixel rows of the LCD panel 4, each pixel row generating image 1 or 2.

Figure 3:
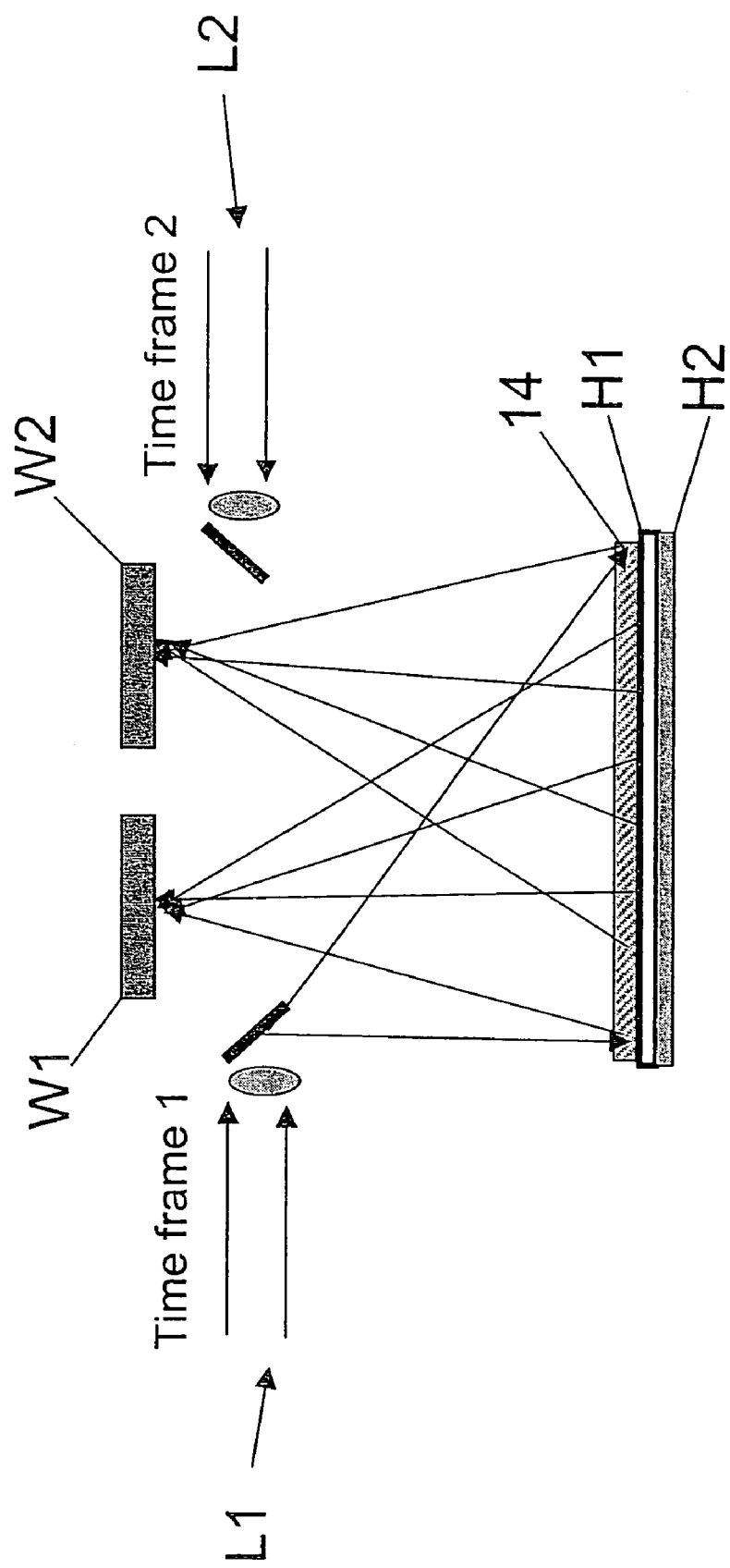
FIG. 3 illustrates one possible configuration of time-sequential operation of multi-view reflective attachment to a direct view LCD device.

To increase the resolution of the display device in multi-view operation, it is suggested to use a time-sequential mode and two types of spatially multiplexed continuous (i.e. non-pixellated) reflective HOEs H1 and H2 and a transmissive LCD 14, as illustrated in FIG. 3.

Holographic element H1 is designed in such a way that it diffracts light from light source L1 into viewing window W1. It has substantially no effect for light source L2 or any other external light source at a different location.

Holographic element H2 is designed in such a way that it diffracts light from light source L2 into viewing window W2. It has substantially no effect for light source L1 or any other external light source at a different location.

In the first mode as described hereinbefore, the holographic elements H1, H2 have no substantial effect on light from the backlight (not shown) and the displayed image is visible throughout an extended viewing region in front of the LCD 14. In the second mode, in a Time Frame 1, only light source L1 operates and the LCD 14 generates an image for a viewing window W1. This image is reflected by H1 into viewing window W1. In Time Frame 1 there is no image in window W2.

In a Time Frame 2 only light source L2 operates and the LCD 14 generates an image for a viewing window W2. This image is reflected by H2 into viewing window W2. In Time Frame 2 there is no image in window W1.

The advantage of this embodiment is that it combines the full brightness 2D mode of the LCD device 14 with full resolution multi-view operation. Furthermore, elements H1 and H2 (which are non-pixellated) do not require precise alignment with the pixel structure of LCD 14 (unlike the arrangements of FIGS. 1 and 2).

Light sources L1 and L2 may operate in a continuous regime and be provided with shutters, synchronised with the panel time frames.

Alternatively, light sources L1 and L2 may operate in a pulse regime, with their switching time synchronised with the panel time frames.

Alternatively, a continuous single light source may be used in co-operation with beam steering means, which image the source into two positions, the re-direction time being synchronised with the panel time frames.

Figure 4:
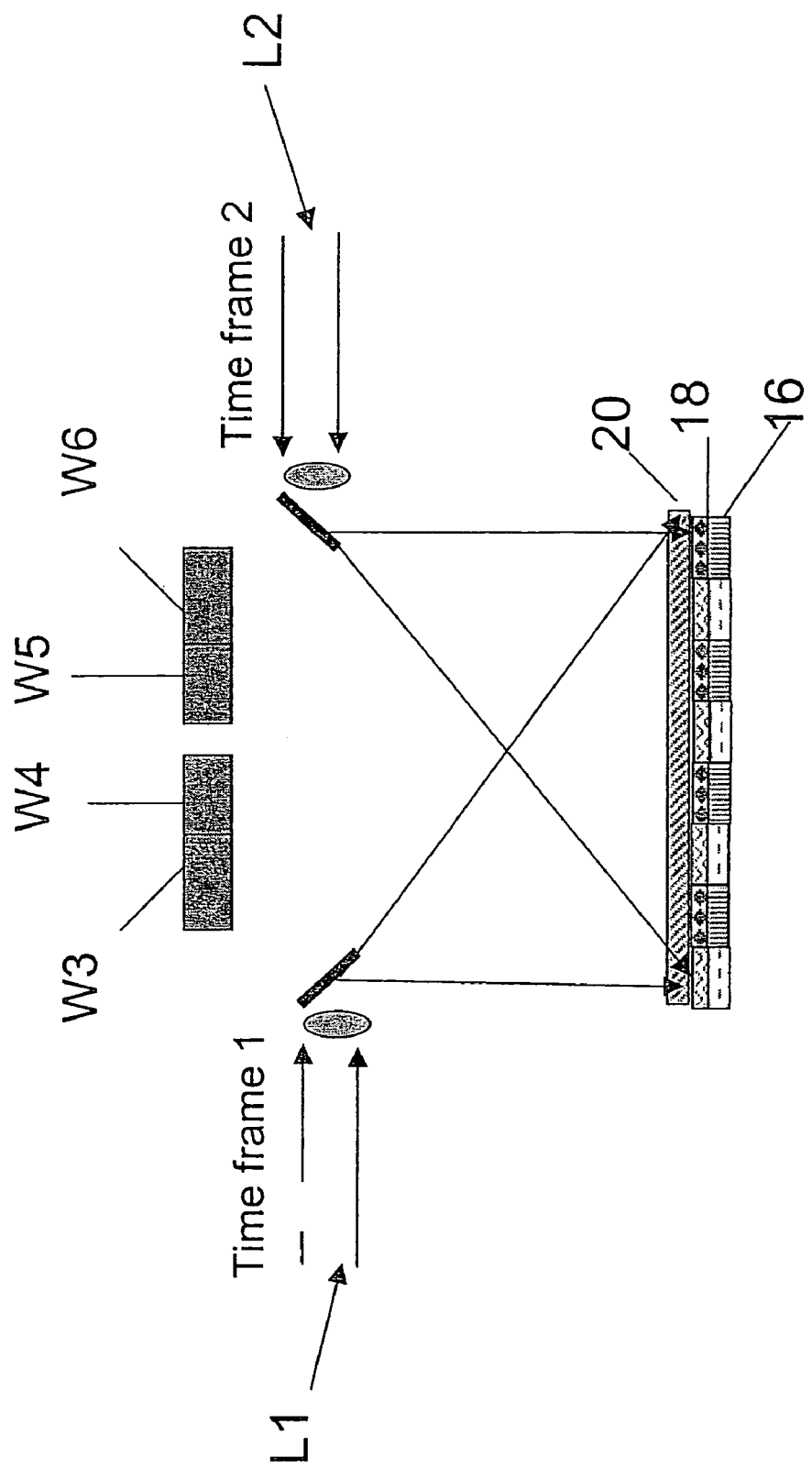
FIG. 4 illustrates one possible configuration of time-sequential operation of multi-view attachment to a direct view LCD device for generation of 4 viewing windows.

A further embodiment shown in FIG. 4 differs from that shown in FIG. 3 in that it uses 2-frame time sequential operation of a multi-view display device and two holographic optical elements 16 and 18 with alternating stripes for generation of 2 viewing windows in each time frame, in the same manner as explained in FIG. 2.

Holographic element 16 is designed in such a way that it diffracts light from light source L1 into viewing windows W3 and W4. It has substantially no effect for light source L2 or other external light sources at different locations.

Holographic element 18 is designed in such a way that it diffracts light from light source L2 into viewing window W5 and W6. It has substantially no effect for light source L1 or other external light sources at different locations.

In Time Frame 1, only light source L1 operates and the LCD 20 generates images for viewing windows W3 and W4. These images are reflected by the hologram 16 into viewing windows W3 and W4. As hologram 18 has no effect for light source L1, in Frame 1 there are no images in windows W5 and W6.

In Time Frame 2, only light source L2 operates and the LCD 20 generates images for viewing windows W5 and W6. These images are reflected by the hologram 18 into viewing windows W5 and W6. As hologram 16 has no effect for light source L2, in Frame 2 there are no images in windows W3 and W4.

This embodiment has an advantage of generating 4 viewing windows with half the resolution of the 2D mode of the display device.

Alternatively, hologram 16 may be designed to diffract light from light source L1 into viewing window W3 and W5, and 18 to diffract light from a light source L2 into viewing windows W4 and W6. In this embodiment viewing windows W3 and W5 are generated in Time Frame 1; and W4 and W6 in Time Frame 2.

Figure 5:
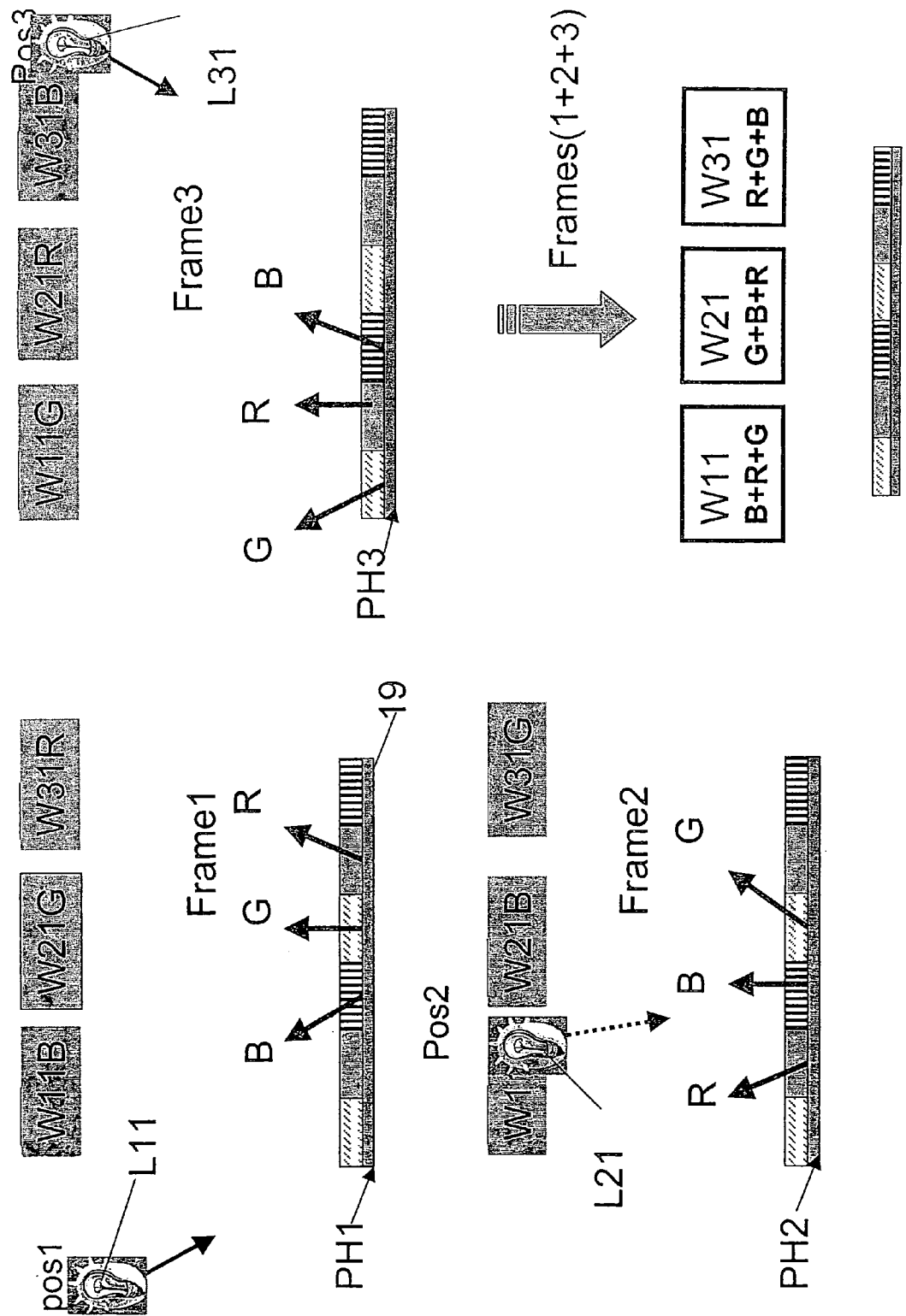
FIG. 5 illustrates principle of operation of one possible configuration of multi-view attachment with time and colour sequential generation of 3 viewing windows.

FIG. 5 illustrates the principle of operation of a display device with time and colour sequential generation of 3 viewing windows, W11, W21 and W31.

Thus, a holographic optical element consists of 3 spatially multiplexed elements PH1, PH2 and PH3 (which may be HOEs on top of each other, or formed in the same layer of material). When illuminated by the light source L11 from a position 1, only PH1 diffracts light; PH2 and PH3 have substantially no effect for light source L11. PH1 diffracts blue spectral component into viewing window W11, green into viewing window W21, and red into window W31.

Similarly, only PH2 diffracts light when illuminated by the light source L21; PH1 and PH3 have substantially no effect for source L21. PH2 diffracts red spectral component into viewing window W11, blue spectral component into window W21 and green into window W31.

Further, only PH3 diffracts light when illuminated by the light source L31; PH1 and PH2 have substantially no effect for source L31. PH3 diffracts green spectral component into viewing window W11, red spectral component into window W21 and blue into window W31.

In a Time Frame 1 only light source L11 is ON; L21 and L31 are OFF. Blue pixels of LCD 19 are addressed for image 1 (displayed in viewing window W11), green pixels for the image 2 in W21, red pixels for the image 3 in W31.

In Time Frame 2 only light source L21 is ON; L11 and L31 are OFF. Blue pixels of LCD 19 are addressed for image 2 (displayed in viewing window W21), green pixels for the image 3 in W31, red pixels for the image 1 in W11.

In Time Frame 3 only light source L31 is ON; L11 and L21 are OFF. Blue pixels of LCD 19 are addressed for the image 3 (displayed in viewing window W31), green pixels for the image 1 in W11, red pixels for the image 2 in W21.

As a result, after three frames a full RGB colour image is displayed in each viewing window W11, W21 and W31. An advantage of this embodiment is that each of the 3 images has the full resolution of 2D mode.

Light sources L11, L21 and L31 may be located at positions 1, 2 and 3, operate in a continuous regime and be provided with shutters, synchronised with panel frames.

Alternatively, light sources L11, L21 and L31 may be located at positions 1, 2 and 3 and operate in a pulse regime, with their switching time synchronised with panel frames.

Alternatively, a continuous single light source may be used in co-operation with beam steering means, which image the source into positions 1, 2 and 3, its re-direction time being synchronised with panel frames.

To increase the angular separation between two images and enable a display device with HOE for autostereoscopic mode to operate in a dual-view regime, an attachment may be further provided with a prism element 84, located in the plane of autostereoscopic viewing zones, as illustrated schematically in FIG. 6.

Figure 7:
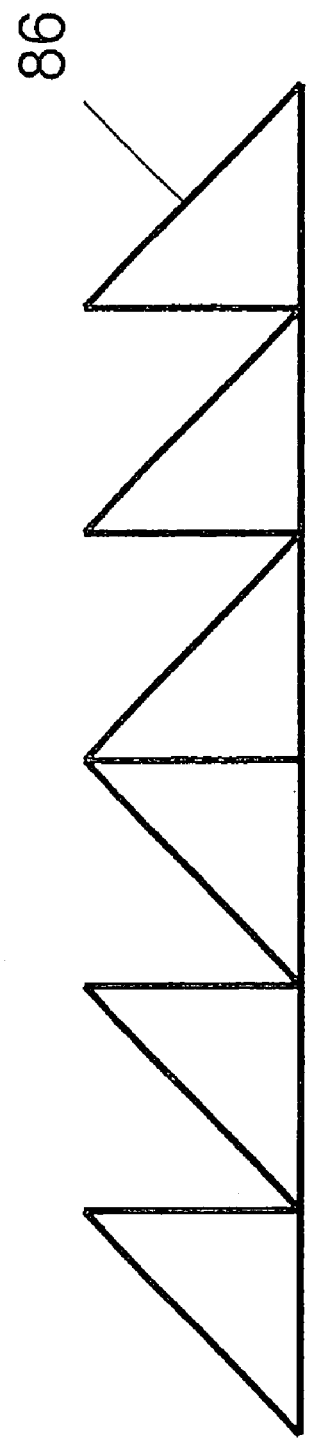
FIG. 7 shows a further embodiment of a multi-view attachment with enhanced angular separation of images using: micro-prism array for reduced size and weight.

To reduce the weight and size of such an element 84 for increased angular separation, it may be fabricated as an array of micro-prisms 86, as shown in FIG. 7.

Figure 8:
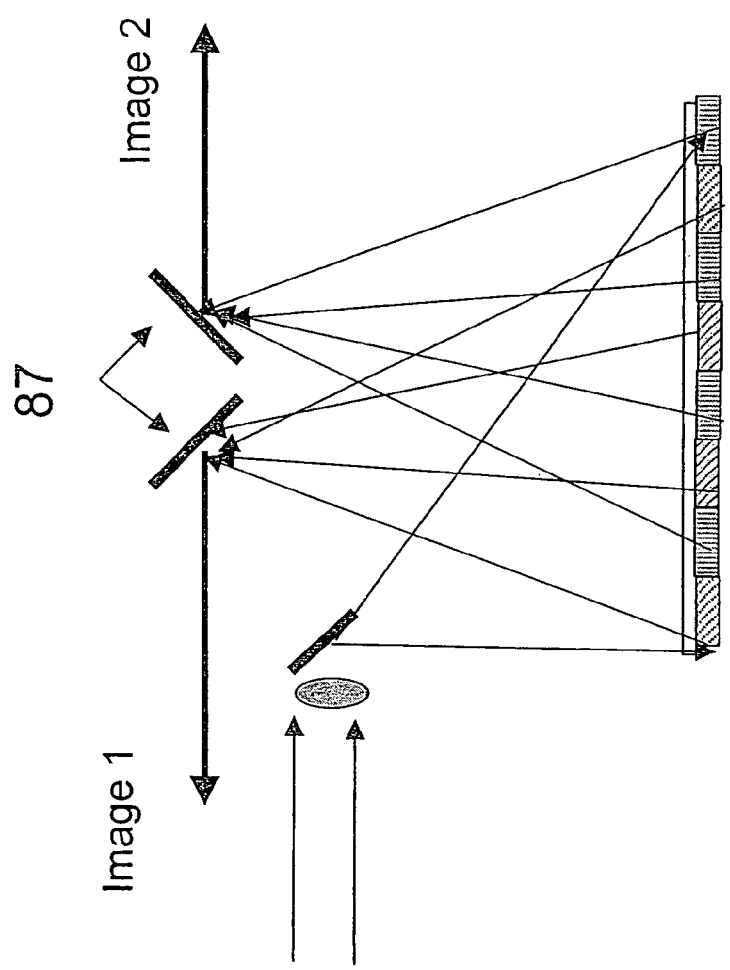
FIG. 8 shows the use of a mirror system.

Alternatively, to increase the range of separation angles between two images, this element 84 may be in a form of tilting mirrors 87, as shown in FIG. 8.

Elements 84, 86 or 87 may be removable to allow easy switch between 3D and dual view modes of operation.

Figure 9:
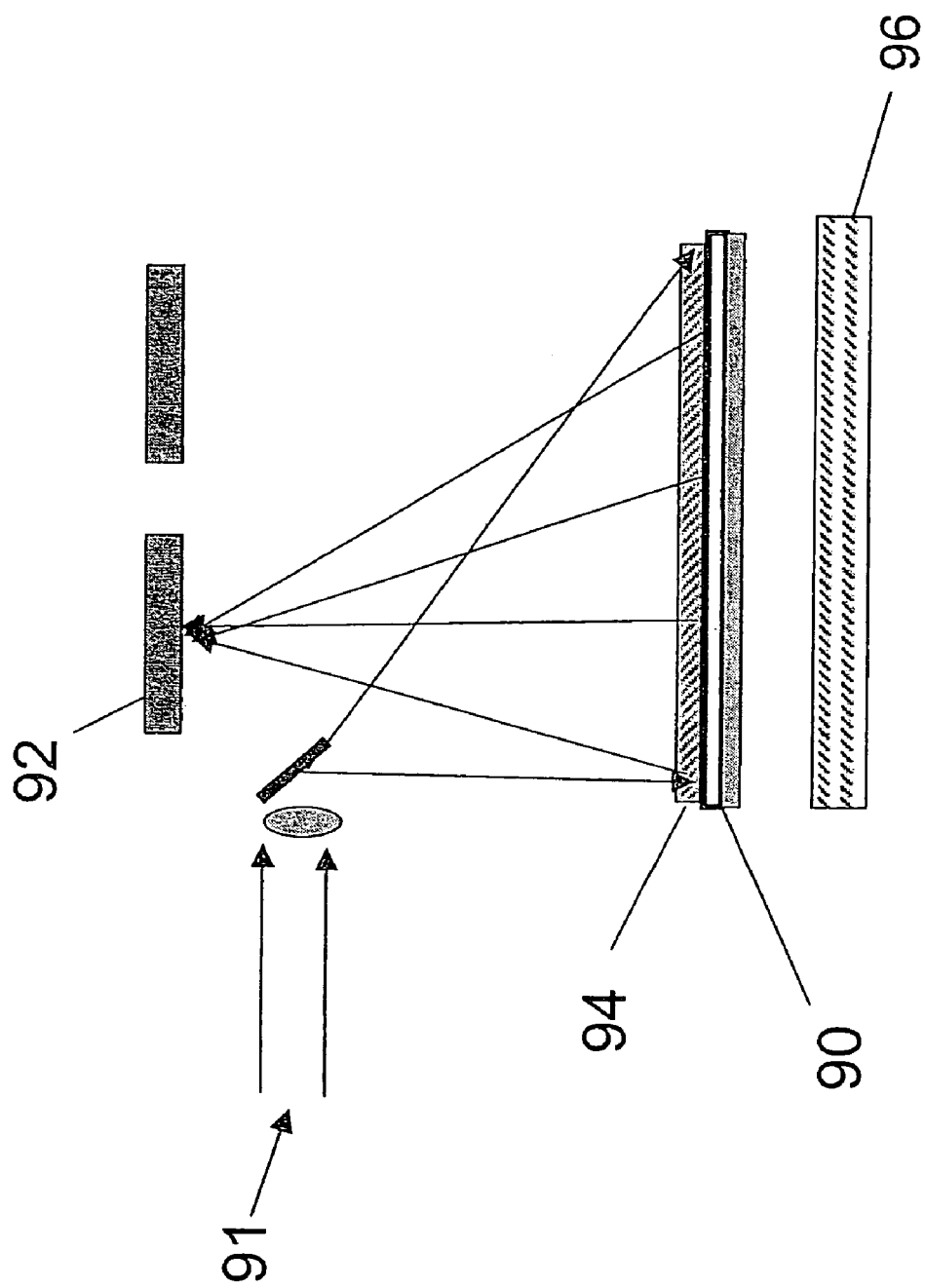
FIG. 9 shows an embodiment having a single HOE and a single spatially limited viewing window.

FIG. 9 shows an embodiment having a single volume reflection HOE 90 for directing light from source 91 into a single spatially limited full resolution viewing window 92. A transmissive LCD 94 is provided. When light source 91 is switched off, a backlight 96 can be used to display an image on the LCD 94 which is visible both inside and outside of the viewing window 92. In this way the embodiment can be used to display a full resolution image to a viewer in viewing window 92 only, which is not visible to any viewer who is outside of the viewing window 92.

Figure 10:
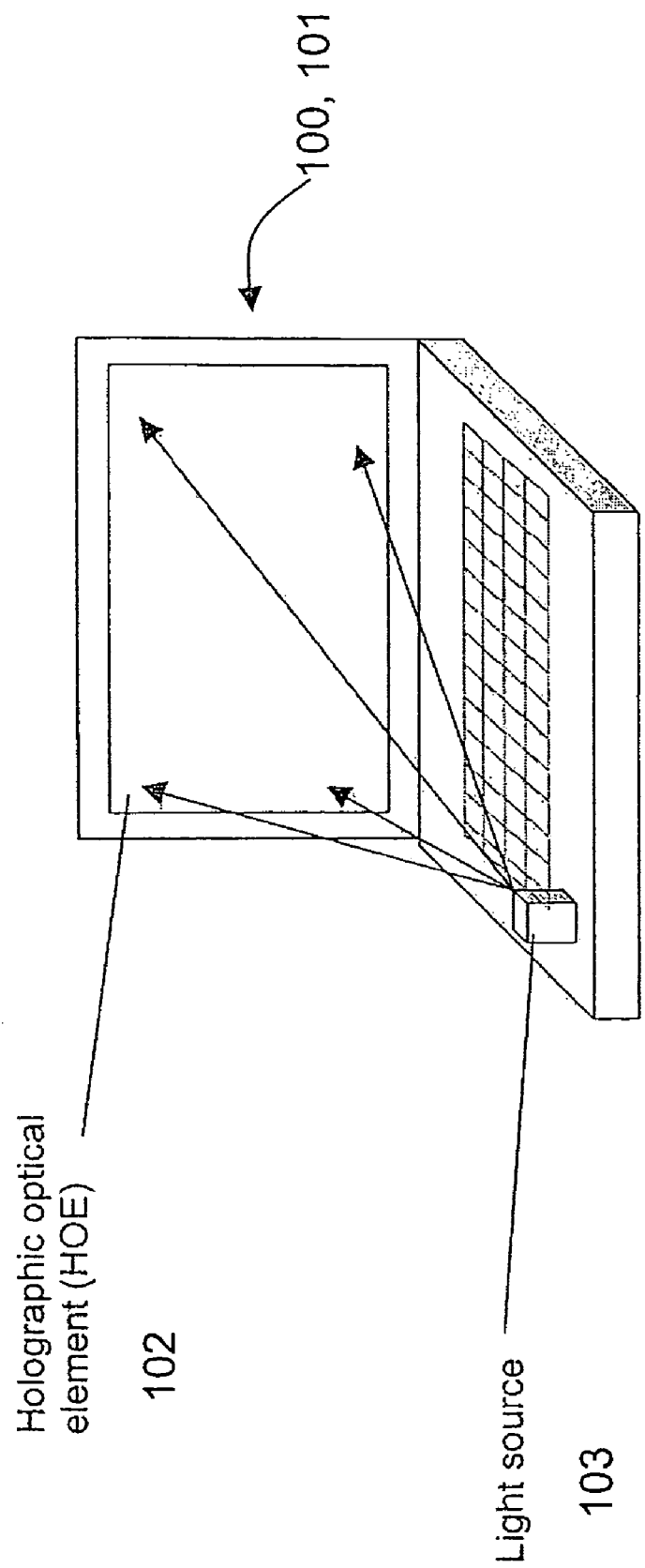
FIG. 10 is a diagrammatic general view of a laptop computer including a display constituting an embodiment of the invention.

FIG. 10 illustrates the use of a display in a laptop computer and FIGS. 11 to 14 illustrate an example of a display suitable for such use. This display has a first mode of operation, in which the displayed image may be viewed throughout a wide or extended viewing region, and a second "privacy" mode, in which the displayed image is viewable in a restricted portion of the viewing region.

The display comprises a backlight 100 disposed behind a liquid crystal display panel 101. A volume reflection holographic element 102 is attached to the display panel 101 and a front light source 103 is disposed in front of the panel 101 and the element 102. The holographic element 102 may be disposed in front of the panel 101 (as shown) or behind it.

FIG. 11 illustrates operation of the display in the first non-privacy mode. In this mode, the backlight 100 is switched on whereas the front light source 103 is switched off. The holographic element 102 is not responsive to light from the backlight 100 and therefore appears to be substantially uniformly transparent. Thus, the image displayed by the panel 101 is visible throughout a wide viewing region in front of the display determined by the characteristics of the backlight 100 and the panel 101.

FIG. 12 illustrates the function of the holographic element 102 when the front light source 103 is switched on. Light reaching the element 102 from the light source 103 satisfies the Bragg condition of a hologram recorded in the element 102 and the light is redirected into two side angular ranges illustrated as zone A and zone C. Between the angular ranges as illustrated at zone B, no light is received from the element 102. The effect of this in the second mode of operation of the display is illustrated in FIG. 13. In the second mode, both the backlight 100 and the front light source 103 are switched on. No light is directed from the holographic element 102 into the zone B so that the displayed image is clearly visible in this zone. However, the holographic element 102 redirects light from the front light source 103 into the zones A and C and the redirected light obscures the image displayed by the panel 101 so that this image is substantially unintelligible to a viewer located in zone A or zone C.

The holographic element 102 may be arranged to redirect light uniformly across its extent so as to obscure the image displayed on the panel 101 in the zones A and C. Alternatively, one or more obscuring images may be recorded as holograms in the element 102 so that the or each image is superimposed on and renders unintelligible the image displayed by the panel 101 in the zones A and C.

An example of an obscuring image which is effective for this purpose comprises multiple lines of text and a specific example of such an image is illustrated at (a) in FIG. 14. Such a single image may be visible during the second mode in the zones A and C. However, in an alternative arrangement, the image shown at (a) in FIG. 14 is arranged to be visible in the zone A whereas the negative of this images as shown at (b) in FIG. 14 is arranged to be visible in the zone C. Such an arrangement is efficient in that the whole area of the holographic element 102 is utilised but each point on the element emits light towards only one of the zones and not towards both of the zones.

Figure 15:
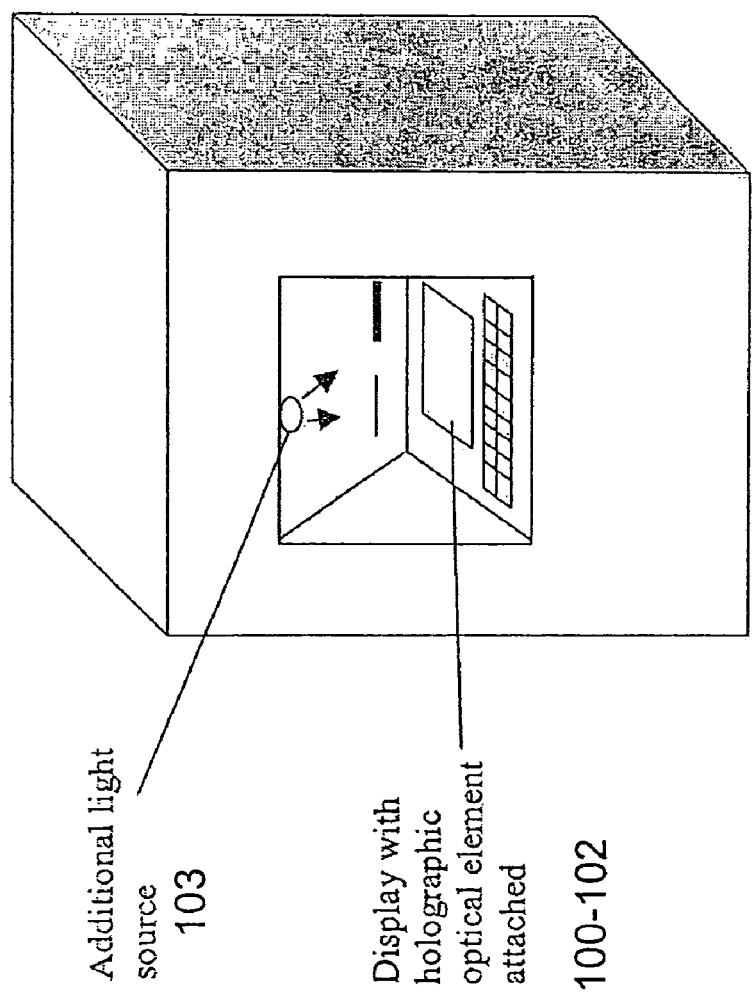
FIG. 15 is a diagrammatic general view illustrating use of a display of the type illustrated in FIGS. 10 to 14 in a automatic teller machine (ATM).

FIG. 15 illustrates the use of a display of this type in an automatic teller machine (ATM) for automatically dispensing money. For example, when the light source 103 is switched off for the first mode of operation, the display 100-102 can be viewed from a wide range of angles and may be used, for example, to display advertising material. When a bank client wishes to use the machine and to read private information without such information being visible to others, the light 103 is switched on so that the displayed information is visible only to the client. Obscuring images may include advertising material so that, in the second mode of operation, the information from the display panel 101 is visible only to the client whereas the advertising material only is visible to others.

A display of this type may also be used in an in-car entertainment system. For example, such a display may be used to display video entertainment to passengers but a vehicle driver must be prevented from being able to watch the video entertainment images while the vehicle is in motion. Thus, the display may operate in the first mode when the vehicle is stationary and in the second mode when the vehicle is in motion.

The front light 103 may include additional elements for beam shaping, polarisation conversion and brightness enhancement and may, for example be of a type disclosed by Omron.

The invention claimed is:

1. A display having a first and second direct view modes of operation and comprising:
    a liquid crystal display device;
    a backlight disposed behind said display device and arranged, during said first mode, to render an image, displayed by said display device during said first mode, visible throughout an extended viewing region in front of said display device;
    a first holographic element; and
    a first front light source disposed in front of said display device and said first holographic element and arranged to be actuated during said second mode, said first holographic element being arranged to redirect light from said first front light source into a part of said extended viewing region so that at least one image displayed by said display device during said second mode is visible only in a restricted portion of said extended viewing region, wherein said first holographic element is a holographic optical element arranged to redirect light from said first front light source to said restricted portion, which comprises at least one spatially limited viewing window, and said backlight is arranged to be deactuated during said second mode, the display further comprising a second holographic optical element and a second front light source disposed in front of said display device, said first and second holographic elements being disposed behind said display device and being arranged to redirect light from said first and second front light sources, respectively, to first and second viewing windows, respectively.

2. A display as claimed in claim 1, in which said first holographic element is a volume reflection hologram and said display device is of a transmissive type.

3. A display as claimed in claim 1, in which said first and second front light sources are arranged to be actuated alternately during said second mode.

4. A display as claimed in claim 1, in which said first and second holographic elements are continuous and non-pixellated.

5. A display as claimed in claim 1, further comprising a third holographic optical elements and a third front light sources disposed in front of said display device, said first to third holographic elements being disposed behind said display device and being arranged to redirect light from said first to third front light sources, respectively, to first to third viewing windows, respectively, said front light sources being arranged to be actuated one at a time in a repeating sequence, each of said holographic elements comprising three sets of regions for redirecting light of three colours into said viewing regions.

6. A display having a first and second direct view modes of operation and comprising:
   a liquid crystal display device;
   a backlight disposed behind said display device and arranged, during said first mode, to render an image, displayed by said display device during said first mode, visible throughout an extended viewing region in front of said display device;
   a first holographic element; and
   a first front light source disposed in front of said display device and said first holographic element and arranged to be actuated during said second mode, said first holographic element being arranged to redirect light from said first front light source into a part of said extended viewing region so that at least one image displayed by said display device during said second mode is visible only in a restricted portion of said extended viewing region, wherein said backlight and said first front light source are arranged to be actuated simultaneously during said second mode; and said first holographic element, when illuminated by said first front light source, redirects light to said extended viewing region outside said restricted portion so as to render said at least one image displayed by said display device unintelligible when viewed from said extended viewing region outside said restricted portion.

7. A display as claimed in claim 6, in which said first holographic element redirects light substantially uniformly into said extended viewing region outside said restricted portion when illuminated by said first front light source.

8. A display as claimed in claim 6, in which said first holographic element, when illuminated by said first front light source, displays at least one obscuring image which is visible in said extended viewing region outside said restricted portion.

9. A display as claimed in claim 8, in which said at least one obscuring image comprises a first obscuring image, which is visible in a part of said extended viewing region outside said restricted portion, and a second obscuring image, which is visible throughout said extended viewing region outside said part and outside said restricted portion.

10. A display as claimed in claim 9, in which said second obscuring image is a negative of said first obscuring image.

11. A display as claimed in claim 10, in which said first obscuring image is a monochrome image.

* * * * *